Jan. 24, 1933.  A. R. FINLEY ET AL  1,895,185
DEVICE FOR DISTRIBUTING AND PACKING COSSETTES IN DIFFUSION BATTERY CELLS
Filed Dec. 18, 1931   2 Sheets-Sheet 1
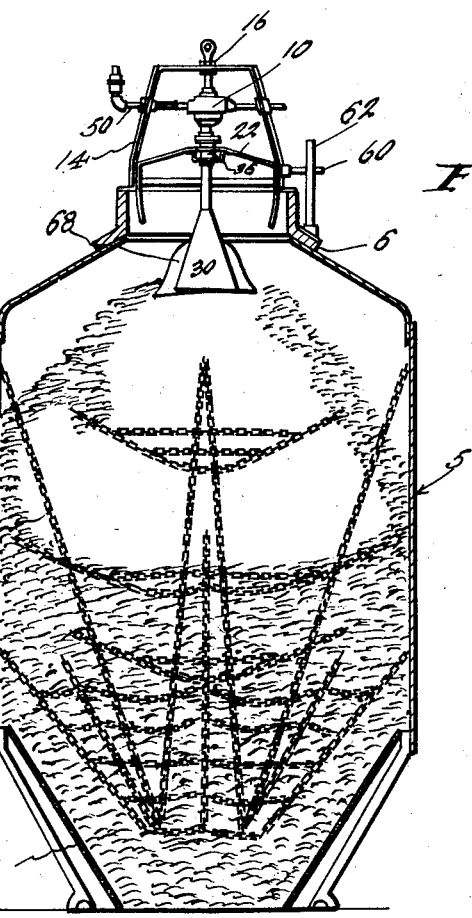
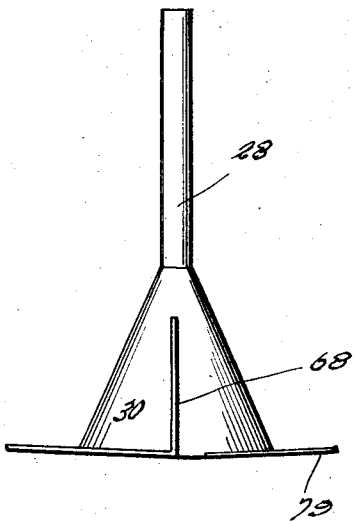
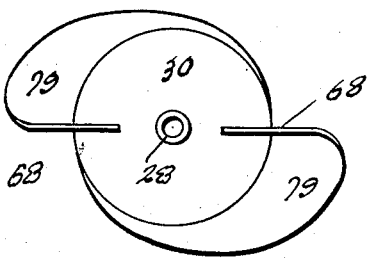
Inventor
A. R. Finley
S. Smith
By Clarence A. O'Brien
Attorney

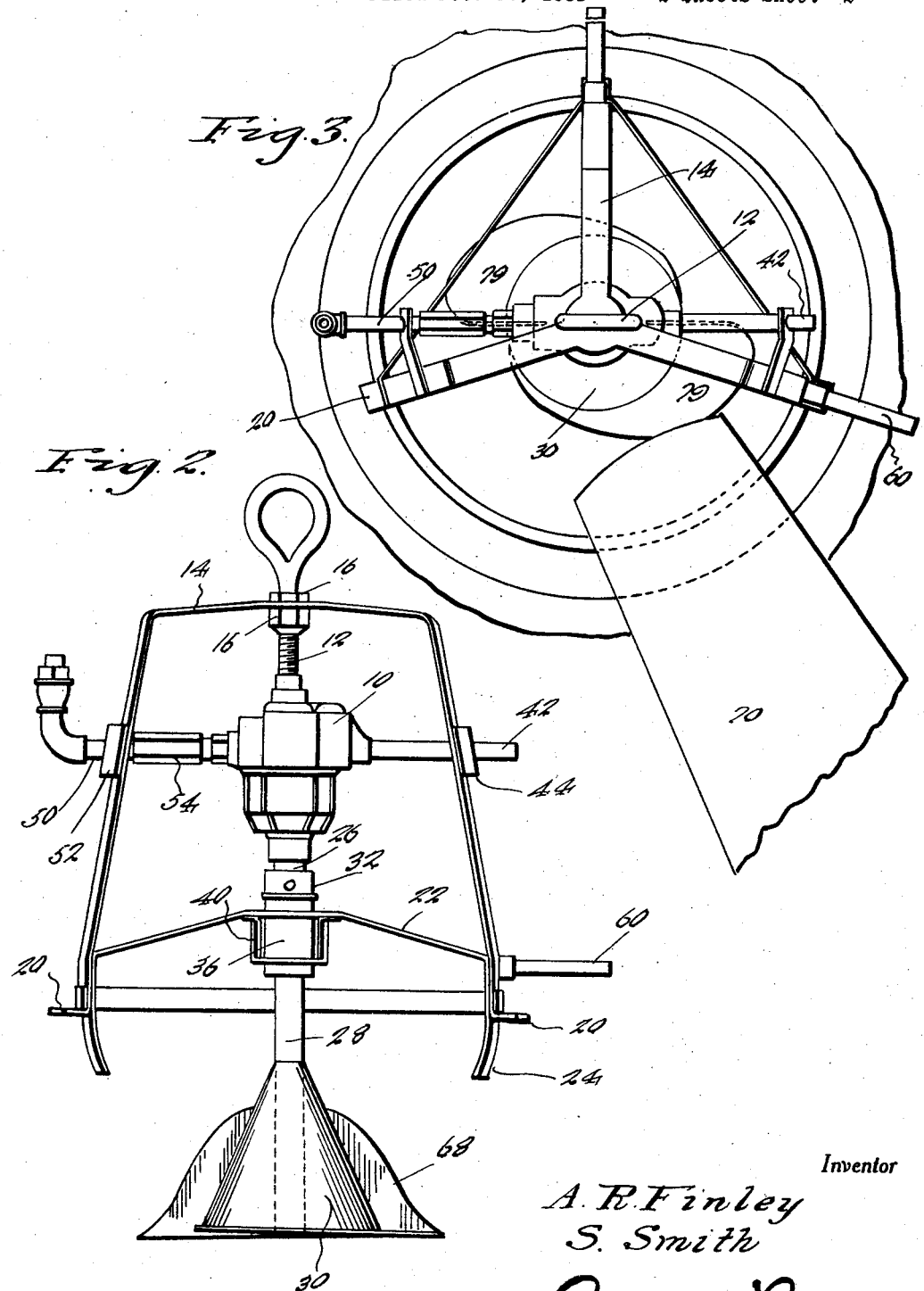

Patented Jan. 24, 1933

1,895,185

UNITED STATES PATENT OFFICE

ANSELL R. FINLEY AND SAM SMITH, OF MASON CITY, IOWA

DEVICE FOR DISTRIBUTING AND PACKING COSSETTES IN DIFFUSION BATTERY CELLS

Application filed December 18, 1931. Serial No. 581,980.

This invention relates to a means for handling beet slices or cossettes in the manufacture or production of beet sugar.

In the process of making beet sugar, the beets go through such preliminary steps as washing, cleaning, slicing and the extraction of the juices from the beets, which juices, of course, carry the sugar content.

This extraction of the juice from the beet slices or cossettes is done in diffusion battery cells having the upper ends thereof open for the reception of the beet by way of a chute or other suitable means and two men are required to stand over each diffusion battery cell with forks and distribute the slices in an attempt to uniformly pack the cells, while a third man is required to enter each diffusion cell and pack the cossettes and finally distribute the same with his feet.

The invention forming the subject of this application has special reference to a special packing and distributing means adapted to be located at the inlet ends of a diffusion cell to distribute the beet slices or cossettes by centrifugal force, to the end that the slices are uniformly distributed throughout the diffusion cell giving the mass a uniform density throughout and doing away with the necessity of employment of the three men heretofore required for the introduction, distribution and packing in each cell.

The invention in its more specific aspects also contemplates a simple form of distributing means capable of application to the various types of diffusion cells found in the beet sugar industry, allowing the device to be made advantageously in quantities.

Other objects and advantages will be apparent during the course of the following description.

In the accompanying drawings forming a part of this application and in which like numerals are employed to designate like parts throughout the same, Figure 1 is a vertical sectional view through a diffusion cell equipped with the improved distributing means, Figure 2 is a side elevation of the distributing means detached, Figure 3 is a fragmentary plan view illustrating the application of the distributing means, Figure 4 is a side elevation of a rotary head embodied in the invention, Figure 5 is an end view of the rotary head.

In the drawings, wherein for the purpose of illustration is shown a preferred embodiment of the invention, the numeral 5 designates a diffusion cell more or less conventional in design and having the upper portion thereof restricted to form a neck 6.

As shown in Figure 1, it is customary to suspend a sort of network 7 of chains within the battery cell and from the side wall thereof to hold the weight of the mass of material off the bottom and off the side screen 8 and this has complicated the uniform distribution of the beet slices in the cells, and at the same time has made it difficult to provide uniform packing and density of the mass of the material introduced by way of the neck 6.

As shown in Figure 2, a motor 10 preferably driven by compressed air is suspended from an attaching screw 12, the intermediate portion of the screw being extended through the central portion of a triangular frame 14 and held in place by lock nuts 16.

As shown in Figure 2, the frame 14 is provided with depending sides having outwardly projecting terminal portions 20 adapted to rest upon the upper end of the neck 6 adapting the device to application to various diffusion cells. A triangular or spider-like bracing frame 22 is shown to be positioned within the main frame and has the legs thereof secured to the lower portions of the legs of the main frame 14 and the terminal portions of the legs of the spider are curved inward slightly as indicated at 24 for reception in the neck 6.

In carrying out the invention, the motor 10 is provided with a depending drive shaft 26 received within the tubular shaft 28 of a rotary head 30. Suitable means, such as a collar 32 and a set screw on the collar may be employed to rigidly connect the drive shaft 26 and the driven shaft 28 to cause these parts to rotate together and a bronze or other bushing 36 may be mounted on the upper portion of the tubular shaft 26 and is shown to be extended through the central portion of the brace 22 and through a U-shaped bracing member 40.

As further shown in Figure 2, the motor 10 is provided with a more or less radial arm 42 extended through a suitable supporting bracket 44 carried by one of the sides of the frame so that the motor is held in a predetermined position with respect to the frame. That is to say, the motor is held against turning with respect to the frame first by the arm 42 and second by the fact that the feed line 50 for the motor is extended through a second bracket 52, this second bracket being secured to one of the sides of the frame 14.

A suitable manually controlled valve 54 is incorporated in the feed line and provides a simple means by which the flow of pressure fluid through the motor may be regulated, this feature being intended to provide for the sensitive regulation of the speed of the motor, this being an important consideration determined by the rate of material, speed and the like.

When the frame with the motor therein is mounted on the neck 6 a radial handle and stop element 60 carried by the frame may be engaged with an upstanding post 62 to limit turning of the frame and the motor as a unit. Also the member 60 provides an aid to the handling of the apparatus while being applied and removed.

The rotary head 30 is shown to depend into the upper portion of the diffusion battery cell and to be provided with radial diffusing wings 68, adapted to engage the beet slices upon being introduced into the cell and to throw the same outward by centrifugal force down into the cell, it being obvious that the rate of speed of the rotary head and the vanes 68 thereof will determine the force with which the beet slices are thrown and the outward travel of the beet slices.

It will be observed that the lower edge of the head 30 is provided immediately in advance of the vanes 68 with circumferential ledges 79 forming a means to support the material for engagement by the vanes. In other words, the more or less horizontal ledges 79 are located at the leading sides of the vanes 68 and hold the beet slices in position to be thrown outward centrifugally by the rotating vanes 68, thereby preventing the excess accumulation of the material at the center of the cell.

In operation, beet slices are introduced into the neck by way of a chute 70 and the beet slices upon encountering the rotary head 30 and the vanes 68 thereof will be uniformly distributed through the diffusion cell, thereby doing away with the necessity of two men ordinarily required to spread the material at the inlet end of the cell and a third man to pack the material in the cell.

It has been found that the use of the rotary head, which is of cone-shaped formation to spread the material will distribute sliced beets more evenly in the diffusion battery cells and will increase the amount of slices put into each cell. As previously stated, due to the system of chains holding the weight off the bottom of the cell and the side screens of the diffusion battery cell, there has been much trouble in getting the slices evenly spaced and packed in each cell and the improved spreading means will give a more even packing and density, diminishing the possibility of diffusion juice channeling, so that there is, in consequence, better control of the sugar in the exhausted cossetts or beet slices.

With a better packed cell and good circulation, the diffusion battery capacity will be increased and a heavier diffusion juice will be had which will make a better working juice through the factory so that there will be less water to evaporate in the evaporating apparatus. The percentage of draft will be lowered by the practice of this invention and by this is meant the per cent of weight of the diffusion juice drawn off as compared to the weight of the beet, a better purity juice will be had for the exhaustion of sugar from beet slices.

In summarizing, it will be seen that the invention increases the beet slicing capacity of a plant with a better control of the sugar lost in the exhausted beet pulp, saves labor, economizes on fuel in making a heavier density diffusion juice and a purer juice is delivered from the diffusion battery.

The invention forming the subject of this application is capable of a wide variety of mechanical expressions. For example, the individual heads 30 and the vanes thereof may be adapted to individual requirements, or the attaching frame may be varied to meet existing conditions. Thus, it is to be understood that the form of invention herewith shown and described is to be taken merely as a preferred example of the same and that such minor changes in arrangement and construction of parts may be made as will remain within the spirit of the invention and the scope of what is claimed.

Having thus described the invention what is claimed is:—

1. In a device for distributing and packing cossettes in diffusion battery cells, a distributor head comprising a conical body having a pair of vertical vanes projecting radially therefrom at diametrically opposite sides of the body, and a circumferentially extending ledge at the largest end of said body for each vane, said ledge being disposed immediately in advance of its vane, and also being disposed at an angle to the horizontal and sloping toward the base of said vane, said ledge also having a top face sloping inwardly from the outer edge of the ledge toward said head.

2. In a device for application to diffusion battery cells, a rotary head of cone shaped formation having reversely extending vanes and tapered ledges at the largest end of the head and disposed at an incline to the horizontal, said ledges sloping toward the bases of said vanes and being arranged in advance of said vanes, each of said ledges also having an outer convex edge merging at one end with the outer edge of a vane, and at a relatively opposite end merging with the peripheral face of said head.

In testimony whereof we affix our signatures.

ANSELL R. FINLEY.
SAM SMITH.